G. M. ANDERSON.
AUTOMOBILE LOCKING MEANS.
APPLICATION FILED OCT. 27, 1916.

1,250,123.

Patented Dec. 18, 1917.
2 SHEETS—SHEET 1.

WITNESSES
C. R. Miller
H. H. Babcock

INVENTOR
Gustaf M. Anderson.
BY Richard B. Owen,
ATTORNEY

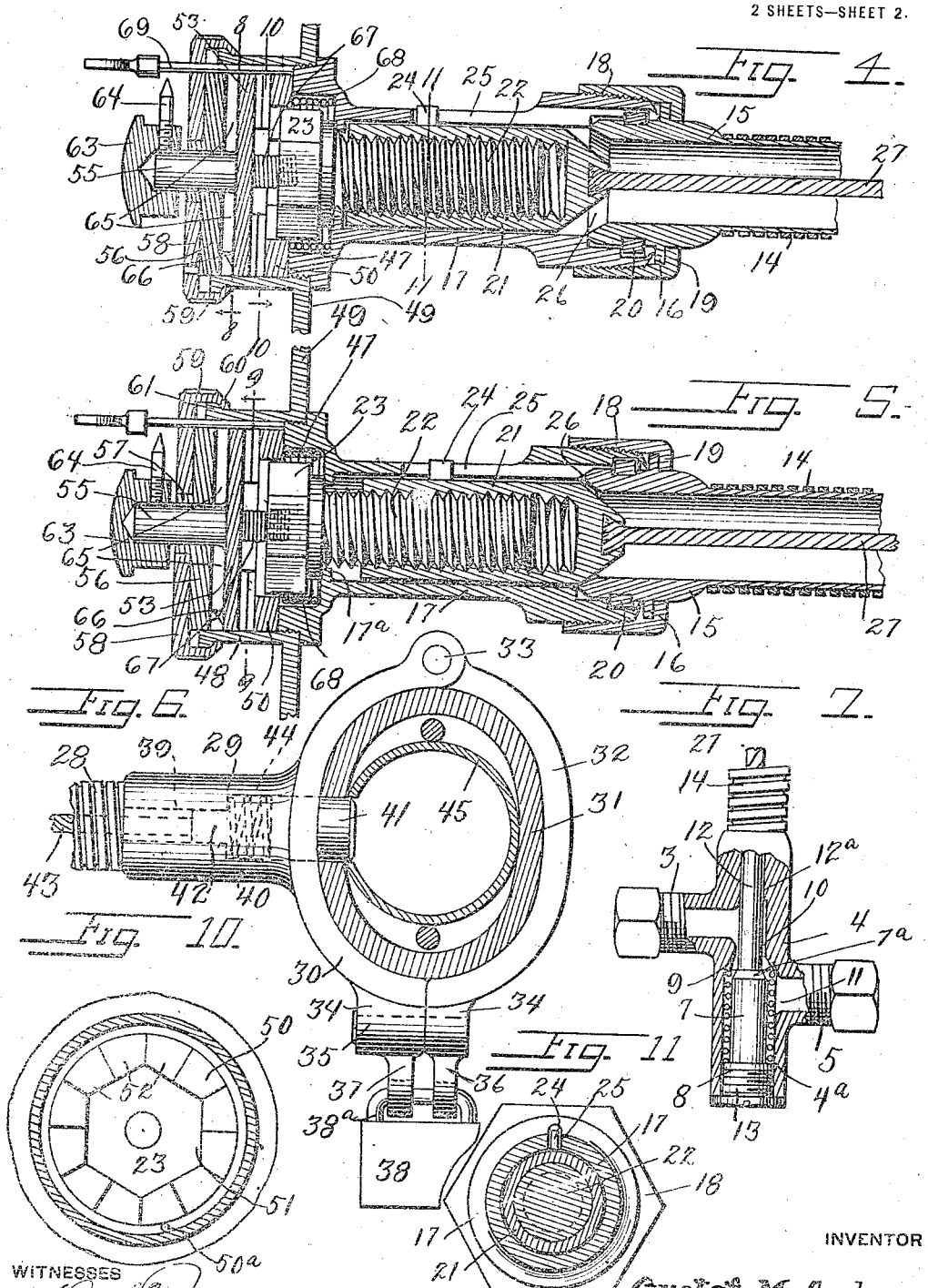

UNITED STATES PATENT OFFICE.

GUSTAF M. ANDERSON, OF CHICAGO, ILLINOIS.

AUTOMOBILE-LOCKING MEANS.

1,250,123.　　　　Specification of Letters Patent.　　Patented Dec. 18, 1917.

Application filed October 27, 1916.　Serial No. 128,099.

*To all whom it may concern:*

Be it known that I, GUSTAF M. ANDERSON, a citizen of the United States, residing at Chicago, in the county of Cook and State of Illinois, have invented certain new and useful Improvements in Automobile-Locking Means, of which the following is a specification.

This invention relates to locking means for automobiles, and more particularly to means for shutting off the supply of fuel from the fuel tank to the engine or for locking the steering post, thus effectually preventing unauthorized persons using the automobile.

One of the main objects of the invention is to provide a locking means of the character stated of simple construction and operation which can be easily applied to any automobile of standard construction. A further object is to provide a slidably mounted valve interposed in the fuel supply pipe having means attached to the same for moving the valve axially. Another object is to provide actuating means for the locking device which is so arranged as to be subjected to tension only, connecting cords or cables being relieved of all torque. A still further object is to provide a combination controlling lock so constructed that only persons familiar with the combination of this lock can operate the locking devices. Further objects will appear from the detail description.

In the drawings:

Fig. 6 is a detail plan view of the lock for the steering post;

Fig. 7 is a side view of the fuel supply pipe valve casing broken away to show the interior construction;

Fig. 8 is a section taken substantially on line 8—8 of Fig. 4;

Fig. 9 is a section taken substantially on line 9—9 of Fig. 5;

Fig. 10 is a section taken on line 10—10 of Fig. 4;

Fig. 11 is a section taken on line 11—11 of Fig. 4.

Figure 1:
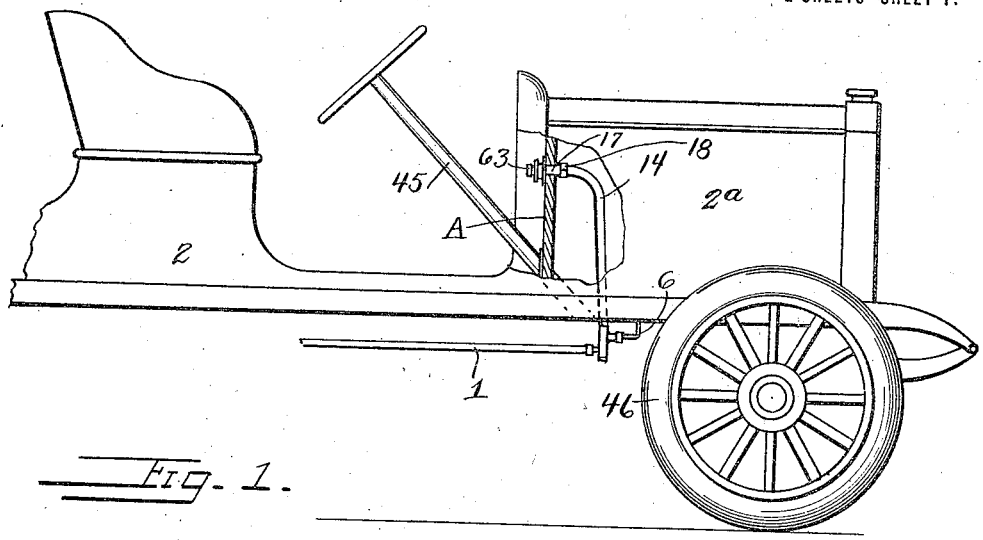
Figure 1 is a fragmentary side view of an automobile with the invention applied.
Figure 2:
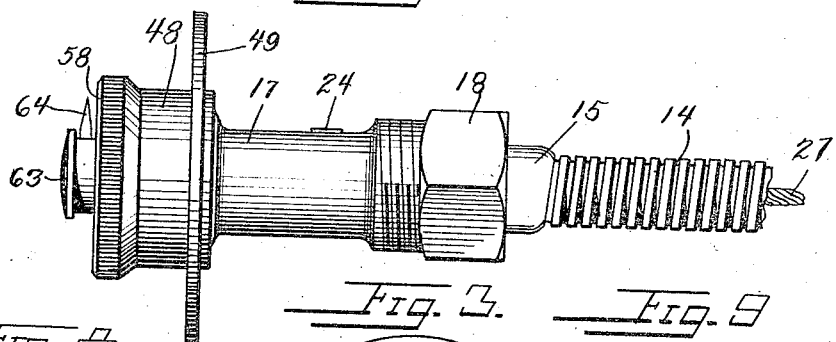
Fig. 2 is a side view of the controlling lock casing and the members associated therewith.
Figure 5:
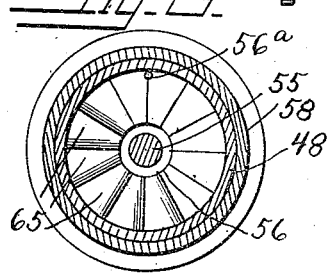
Fig. 5 is the same in inoperative position.

The fuel pipe 1 communicates with the usual tank mounted in any suitable position on the automobile body 2. The forward end of this supply pipe communicates with a nipple 3 extending at right angles to the cylindrical valve casing 4. A second nipple 5 is provided below nipple 3 and diametrically opposite thereto. This nipple 5 is connected to a feed pipe 6 which is connected to the carbureter in the usual manner. The valve casing 4 is provided with a longitudinally extending central bore the lower portion of which is enlarged as at $4^a$ to form a valve chamber. A cylindrical valve 7 is mounted in this valve chamber and is provided, on its lower end, with an enlarged disk head 8. An inner annular shoulder 9 is provided at the upper end of valve chamber $4^a$ contiguous to an upwardly tapering valve seat 10. A coil spring 11 is mounted about the body of valve 7 and is confined between the head 8 of the valve and the shoulder 9. This spring acts to normally hold the valve downward off of the valve seat 10. The stem 12 of the valve extends upward and is slidable in the central bore of the valve casing, and this bore is slightly enlarged at its intermediate portion, as at $12^a$, so that, when the valve 7 is in lowered position the fuel will flow freely through nipple 3 into the valve chamber $4^a$ and thence through nipple 5 to the feed pipe 6 and the carbureter connected thereto. The downward movement of valve 7 is positively limited by a screw plug 13 threaded into the lower end of valve chamber $4^a$. The upper end of valve 7 is of frusto-conical shape as at $7^a$, so as to fit snugly into the valve seat 10 and effect a fluid tight closure therewith thus preventing flow of fuel from fuel pipe 1 to feed pipe 6.

An armored tubing 14 is secured at one end in the upper end of valve casing 4 and communicates with the central bore thereof. The other end of this tubing is provided with a thimble 15 having an outer annular flange 16. This thimble fits into the outer end of a cylindrical sleeve 17. The outer end of this sleeve is externally threaded to receive an internally threaded securing nut 18 provided with an inner annular flange 19. This flange is adapted to fit snugly about the body of thimble 15 above the shoulder 16 so as to secure the thimble tightly within the sleeve. A split ring packing 20 is mounted in an annular groove in thimble 15 below shoulder 16 and engages into an annular groove in the inner face of sleeve 17. This packing prevents looseness or play between the sleeve and thimble. An inner sleeve 21 is slidably mounted in sleeve 17 so as to be movable longitudinally of the same. This sleeve is internally threaded to receive a screw 22 provided with the integral hexagonal head 23. The sleeve 21 is provided with a radially projecting lug 24 which extends through a slot 25 through one side of sleeve 17. This lug fits snugly within the slot and serves to positively prevent rotation of inner sleeve 21. The outer end of sleeve 21 is frusto-conical shape so as to fit snugly into the inwardly tapering seat 26 formed in the inner end of thimble 15. Sleeve 17 is provided, adjacent its inner end, with an inner annular shoulder 17ª. This shoulder and the seat 26 of thimble 15 act to positively limit the movement of inner sleeve 21 in either direction.

A cable 27 has one end secured to the outer end of the inner sleeve 21 and the other end secured to the upper end of valve stem 12. This cable is mounted within the armored tubing 14 so as to be protected thereby.

The inner end of sleeve 17 is enlarged to form a usual cylindrical chamber 47. The peripheral wall of this chamber is exteriorly threaded and is adapted to be secured into the inner end of the cylindrical lock casing 48 which is provided with an integral base flange 49 by means of which the casing is secured to the dash A of the automobile. The hexagonal nut 23 at the inner end of screw 22 projects inward beyond the chamber 47 a short distance into the interior of lock casing 48. A ring 50 is rotatably mounted within casing 48 and is provided with a central hexagonal opening 51 which snugly receives nut 23. This ring is provided on its outer face with a plurality of teeth 52 which are directed about the ring toward the left or anti-clockwise. A disk 53 is mounted in the lock casing 48 adjacent ring 50. This disk is provided on its inner face with a plurality of teeth 54 which are directed oppositely to the teeth 52 of ring 50 and is adapted to engage therewith so as to rotate the ring when the disk is turned to the right or clockwise. The disk 53 is provided with a central stem 55 which projects through the center of an outer disk 56 mounted in casing 48. This outer disk is provided with a short neck 57 concentric with stem 55 and fixedly secured in the cylindrical cover 58. This cover has its edge turned downward as at 59, and inward as at 60, to fit about and under a peripheral bead 61 formed at the outer end of casing 48. By this means the cover and disk 56 are rotatably mounted on the casing, and the periphery of the cover is milled to provide a good gripping surface. The outer surface or top of cover 58 is graduated and is provided with a plurality of perforations 62. A thumb nut 63 is secured on spindle 55 adjacent the cover and is provided with a radially extending indicator 64.

Disk 56 is provided on its inner face with a plurality of radially extending teeth 65. These teeth are directed toward the right or clockwise and are adapted to be engaged by a lug or tooth 66 formed on the outer face of disk 53 so that, when cover 58 is rotated to the right disk 53 will be simultaneously rotated therewith.

A coil spring 67 is mounted in a bore provided in the center of the hexagonal head 23 of screw 22. This spring is confined between the inner face of disk 53 and the inner end of this bore, and acts to normally force disk 53 outward. A coil spring 68 is mounted about the hexagonal head of the screw in the cylindrical chamber 47 and is confined between the inner end of this chamber and the inner face of the ring 50. This spring acts to normally force ring 50 outward into close engagement with disk 53. With the ring and disk mounted in the manner described, if the cover 58, or the disk 53, is rotated toward the right or clockwise this rotation will be imparted to the ring 50 and by ring 50 to screw 22 by means of the hexagonal head 23. By turning the screw to the right the sleeve 21 which, as above noted, is secured against rotation, will be drawn outward in the sleeve 17. This outward movement of the inner sleeve 21 will exert tension on the cable 27 which will act to lift valve 7 against the action of coil spring 11. By this means the valve may be lifted and secured firmly in closed position thus shutting off the supply of fuel to the carbureter feed pipe 6 and rendering it impossible to start the engine. On the other hand, if the cover 58 or disk 53 is turned to the left or anti-clockwise the ring 50 will not be rotated. This is due to the fact that the teeth of disks 56 and 53 are directed toward the right or oppositely to the tooth 66 and the teeth 52 of ring 50. The springs 67 and 68, while preventing looseness or play of the disks and ring permit sufficient inward give of these members to insure that disk 53 can rotate anti-clockwise independently of the ring 50. For this reason, when the valve 7 has once been moved into position to cut off the flow of fuel to the carbureter it is impossible to unseat or reopen this valve without operatively connecting the ring 50 to the disk 53 and cover 58 so as to permit the screw 22 to be rotated to the left so as to force the sleeve 21 inward in sleeve 17.

Figure 3:
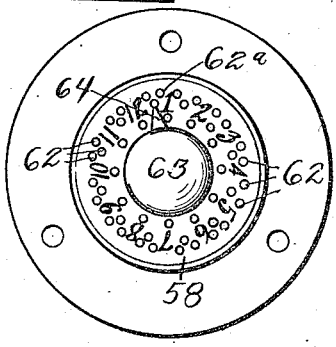
Fig. 3 is a front view of the same.
Figure 4:
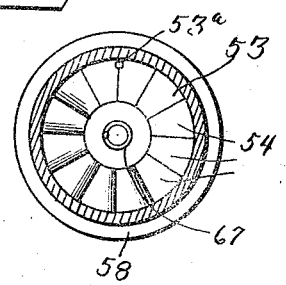
Fig. 4 is a longitudinally vertical sectional view through the controlling lock and operating means showing the relative positions of the various elements of the same in operative position.

In order to permit the valve 7 to be released I provide special means for positively connecting the cover and ring 50, this means being controlled by a combination locking mechanism. For this purpose I provide the disk 56 with an aperture 56$^a$ in alinement with one of the perforations 62 of the cover 58. I also provide the disk 53 with a similar aperture 53$^a$ which is the same distance from the center of the disk as aperture 56$^a$ is from the center of disk 56. The ring 50 is also provided with an aperture 50$^a$ the distance of this aperture from the center of the ring corresponding to the radial distance of the apertures 53$^a$ and 56$^a$. It will be apparent that by rotating the cover 58, disk 53, and ring 50, so as to bring the apertures 53$^a$ and 56$^a$ into alinement these members may be positively connected by inserting a key 69 through the same. In order to bring the apertures in proper alinement, the cylindrical casing 48 is first opened and the disks moved so as to aline the apertures, the position of the indicator 64 on the graduated face of the cover being noted. After this has been done the lock is secured in position on the dash 50, by means of any suitable device which will prevent removal of the same. Thereafter, by rotating the thumb knob 63 so as to bring the indicator to the proper position on the dial of the cover and inserting the key 69 through the proper perforation 62 the valve 7 may be released by turning cover 58 to the left or anti-clockwise. To make this operation clear reference will be made more particularly to Fig. 3 of the drawings. Let it be assumed that in originally assembling the locking mechanism the disk 53 and cover 58 are moved into such position that the apertures thereof are in alinement with each other and with the aperture of ring 50 when the indicator 64 is over the central perforation of the three triangularly arranged perforations between the numbers 12 and 1. In this position if the key 69 is inserted through the uppermost perforation 62$^a$ of the cover it will pass through the alined apertures of the disks 53 and 56 and the ring 50. If the key be withdrawn, and the cover 58 turned to the right so as to close the valve the relative position of the disks and the ring 50 will remain unchanged. On the other hand, if the cover is turned to the left, the position of disk 56 will be changed relatively to disk 53 and ring 50, but the relative positions of the disk 53 and ring 50 will remain the same due to the fact that the cover can be rotated to the left independently of disk 53. By rotating the cover so as to bring the inner one of the perforations between numbers 12 and 1 under the point of indicator 64 the disk 52 and cover 58 will be returned to their initial relative positions so that, by inserting the key through perforation 62$^a$ it will pass through the alined apertures of the disks and cover. With the key in this position the inner end thereof will rest against the outer face of ring 50 near the periphery of the same. By pressing lightly on the key and turning cover 58 to the left the key will be brought into register with the aperture 50$^a$ of the ring and may then be inserted into the same so as to positively lock the cover and the disks and ring together as before. With these members locked together in this manner, by rotating the cover 58 to the left the screw 22 will be operated so as to force the inner sleeve 21 outward in sleeve 17 thus slacking cable 27 and permitting the valve 7 to be moved downward out of its seat by the coil spring 11 thus establishing communication between the fuel supply pipe and the carbureter feed pipe so as to permit operation of the engine. The disk 53 acts as a guard or shield for the ring 50 so as to effectually prevent any one from inserting a sharp pointed instrument through one of the perforations of the cover and forcing the same into biting engagement with the ring 50 thus locking the cover and ring together. With the construction shown and described it is practically impossible for any one not knowing the combination or controlling number of the lock to release the fuel supply control valve 7. Of course, it will be obvious that the indicator 64 need not necessarily point to the particular perforation through which the key should be inserted. For instance, the locking mechanism may be so arranged that with the indicator on the center hole between the numbers 4 and 5 the key could be inserted through the perforation 62$^a$, or any other desired combination could be employed.

By my construction I provide positively acting means for operating the valve 7 which is slidably mounted, and I avoid subjecting the cable to torque such as would tend to distort it. In addition, by operating the valve by direct tension I insure accuracy and positiveness of operation. This feature is deemed an improvement over valve operating mechanisms in which a threaded rotatable valve is employed and is rotated by a cable spring the amount of rotation of the valve being dependent to a large extent upon the resiliency of the operating medium.

In Fig. 6 of the drawings I have shown a modified form of my invention for controlling the steering gear of an automobile instead of the fuel supply. In this form a tube has one end secured in a short sleeve 29 carried by one jaw 30 of semi-elliptical shape of a locking member adapted to be mounted about the steering standard 31 inside of the engine hood 2ª. A similar jaw 32 is pivoted to the jaw 30 as at 33. Each jaw is provided, on its free end, with an integral lug 34. These two lugs are each provided with a bore. One of these lugs is internally threaded to receive a securing screw 35 which is passed through the other bore. This screw is provided with an integral radially extended head so that, by means of the screw, the two jaws 30 and 32 can be forced into tight frictional engagement with the standard 31 so as to secure the lock firmly on the same. One of the lugs 34 is provided with an integral ear 36 and the other lug is provided with a similar ear 37. These two ears are apertured to receive a shackle 38ª of a lock 38. By this means the frame composed of the two jaws 30 and 32 may be secured on the steering standard. This frame is to be made of case hardened steel so that it cannot be filed or sawed and thus removed from the standard. The sleeve 29 is provided with a central bore 39 the inner portion of which is enlarged as at 40. This enlargement provides a cylindrical chamber in which is slidably mounted a latch 41. This latch is provided with an integral outwardly extending reduced stem 42 which is slidable in the bore 39. The outer end of this stem is secured to one end of the cable 43 mounted in the tube 28. A coil spring 44 is mounted about the stem 42 of latch 41 in the enlarged portion or chamber 40 of the bore of sleeve 29. This spring acts to normally hold the latch in its innermost position. The standard 31 is provided with an aperture which receives the latch 41, and the steering rod 45 is provided with a similar aperture. When the steering rod is in such position that the front wheels 46 of the automobile are directed straight ahead the aperture of the steering rod will be in register with the aperture of the standard. When these two apertures are in this position the latch 41 will engage through the same so as to positively lock the guide rod 45 against rotation. This prevents movement of the steering gear so that it is impossible to operate the automobile.

The other end of cable 43 is to be secured to the outer end of the slidable sleeve 21 in the same manner as cable 27 is, and the other end of tube 28 is to be secured to the outer end of the outer sleeve 17 in the same manner as tube 14 is secured. By operating the sleeve 21 in the manner previously described in connection with the fuel control valve 7 tension may be exerted on the cable 43 so as to pulley the latch 41 outward thus releasing the steering rod 45 and permitting operation of the automobile. This form is intended merely as a modification of my locking means showing how it can be well attached for use with either the fuel supply system or the steering gear of an automobile to prevent tampering with the same by unauthorized persons.

In using the above described lock for the steering standard the teeth of the disks and ring of the locking mechanism will be reversed relatively to the positions they occupy in the mechanism described in connection with the fuel supply control valve. By this means, the sleeve to which the cable 43 is connected may be freely slackened so as to control the latch 41 to be moved into operative position, but this sleeve cannot be moved outward so as to tension the cable and thus release the steering standard excepting by persons acquainted with the combination or controlling bar of the locking mechanism.

There may be slight changes made in the construction and arrangement of the various parts of my invention without departing from the field and scope of the same, and I intend to include all such changes, as fall within the scope of the appended claims, in this application in which a preferred form only of my invention is disclosed.

What I claim is:

1. In automobile locking means, the combination of a fuel supply pipe, a feed pipe, a valve casing communicating with said pipes, a slidable valve mounted in the casing, means for normally holding the valve in open position, an outer sleeve, an armored tube having one end secured to one end of the said outer sleeve and the other end secured to one end of the valve casing, an inner sleeve slidably mounted in the said outer sleeve and secured against rotation therein, a cable having one end secured to the valve and the other end secured to the inner sleeve, a screw threaded into the inner sleeve, and means for rotating the said screw and for normally preventing rotation of the screw in one direction.

2. In automobile locking means, the combination of a fuel supply pipe, a feed pipe, a valve casing communicating with said pipes, a slidable valve mounted in the casing, means for normally holding the valve in open position, an outer sleeve, an armored tube having one end secured to one end of the said outer sleeve and the other end secured to one end of the valve casing, an inner sleeve slidably mounted in the said outer sleeve and secured against rotation therein, a cable having one end secured to the valve and the other end secured to the inner sleeve, a screw threaded into the inner sleeve, a means for rotating the screw in one direction so as to cause movement of the inner sleeve in a direction to tension the cable, and means for normally preventing rotation of the screw in the other direction.

3. In automobile locking means, the combination of a valve casing, a valve slidably mounted therein, a spring mounted about the valve and adapted to normally maintain it in depressed position, an outer sleeve, an inner sleeve slidably mounted in the outer sleeve and secured against rotation therein, a screw threaded into the said inner sleeve, said screw provided with a polygonal head, a ring mounted about the head of the screw, means for rotating the ring in one direction, means for normally preventing rotation of the ring in the other direction, and a cable having one end secured to the said inner sleeve and the other end secured to the valve.

In testimony whereof I affix my signature in presence of two witnesses.

GUSTAF M. ANDERSON.

Witnesses:
SUSAN PENDLETON,
DORA BRIDGE.